United States Patent Office 2,898,998
Patented Aug. 11, 1959

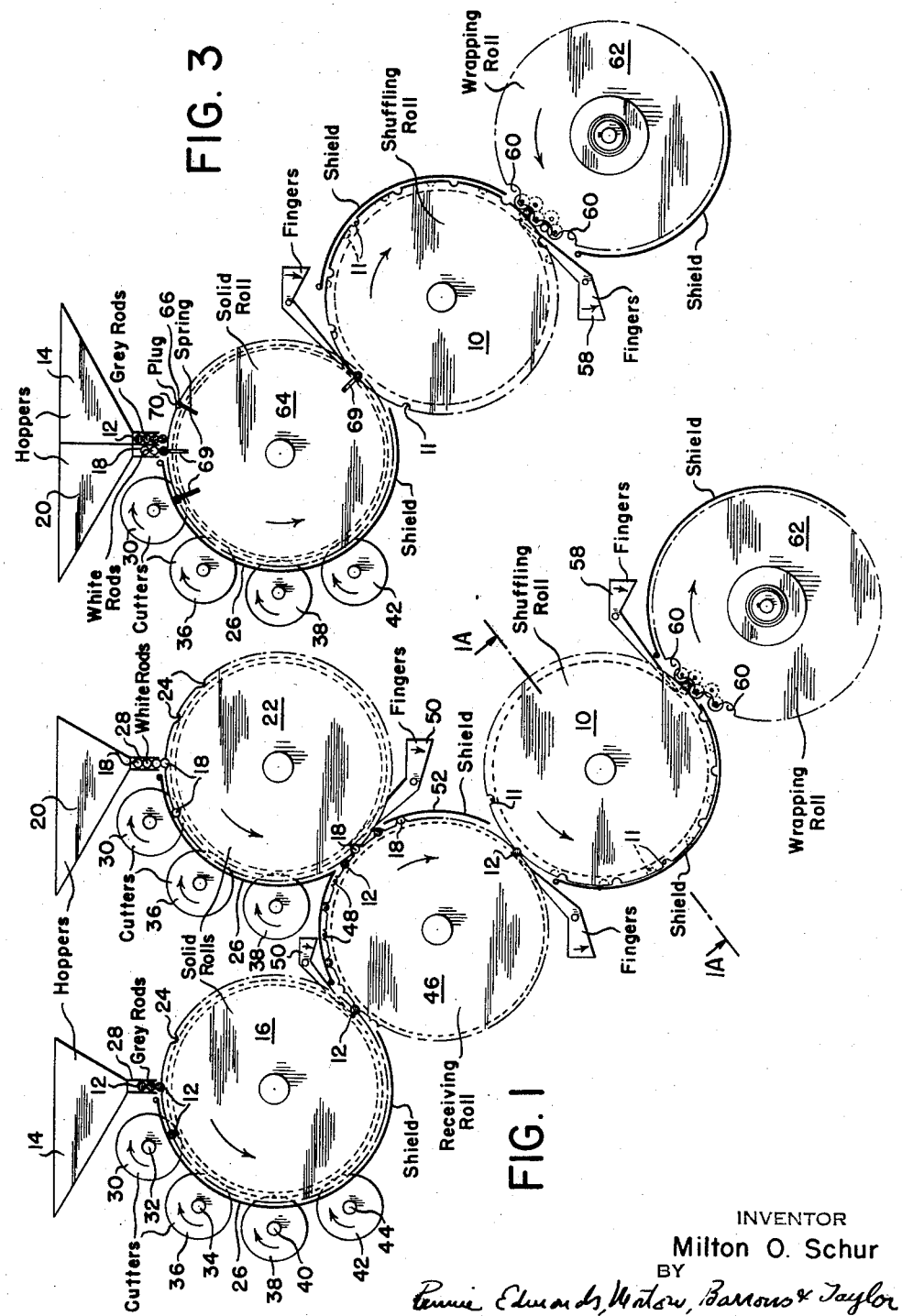

2,898,998

METHOD OF AND APPARATUS FOR CUTTING AND COLLOCATING FILTER TIP

Milton O. Schur, Asheville, N.C., assignor to Olin Mathieson Chemical Corporation, Pisgah Forest, N.C., a corporation of Virginia Application January 15, 1957, Serial No. 634,342

10 Claims. (Cl. 164—61)

This invention relates to a method of and apparatus for making laminated cigarette filter tips and is an improvement over the method and apparatus disclosed in my copending application, Serial No. 578,989, filed April 18, 1956.

In that application I have disclosed a method in which filter rods of two different types of multiple filter section lengths are delivered to carriers on two sets of moving members, cut to filter section lengths, the filter sections of each type being discharged from the moving members alternately aligned and wrapped to form a laminated filter rod of alternate sections of each type. This rod is then cut into filters which are twice as long as the eventual laminated cigarette filter and which have single lengths of one type of lamination at each end and a double length of the other type of lamination between them. Each of the double length laminated filters is arranged between and fastened to two cigarettes, and is then severed through its center to yield two filter tipped cigarettes.

In the present invention, instead of delivering the filter rods to the moving members where the spacing of the alternate sections is to be accomplished, and then cutting them into filter sections, the rods of each type are first delivered to separate rolls or moving members, and are cut into sections while they are in the carriers or pockets of said rolls. The sections are then delivered to carriers of moving members arranged in two sets of alternate members travelling at different speeds whereby a row of transversely aligned carriers at the inlet point of the machine is separated into two rows of transversely aligned carriers at the outlet point.

The filter sections of the other type are either delivered to alternate sets of pockets or carriers of the same set of moving members which are transversely aligned at the inlet point, and in which the faster moving members advance a row of carriers to align with the preceding row of carriers of the slower moving members at the discharge point, or the filter sections of the second type are delivered to a separate arrangement of moving members consisting of two sets of alternate members travelling at different speeds. When this arrangement is used, the filter sections of the second type also deliver their filter sections in two aligned rows at the discharge point, and the sets of moving members are so correlated that the delivered filter sections of the two types are alternately aligned in filter rods at the point of delivery.

The provision of means for cutting the rods into sections prior to their delivery to the moving sections by means of which the sections formed from a rod are arranged in alternately aligned sections has several advantages. It permits the use of much smaller rolls to form the moving members, and thus reduces the over-all height of the machine. It also permits simplification of the cutting mechanism by permitting the knives to be arranged singly or in pairs at several points on the periphery of the rolls where the cutting operation is performed.

The above, and other advantages of the present invention will be apparent from the accompanying drawings illustrating several embodiments of the invention, and in which Fig. 1 is a diagrammatic end elevation of one form of the invention;

Fig. 3 is a similar view of another form of the invention; and

Figure 1A:
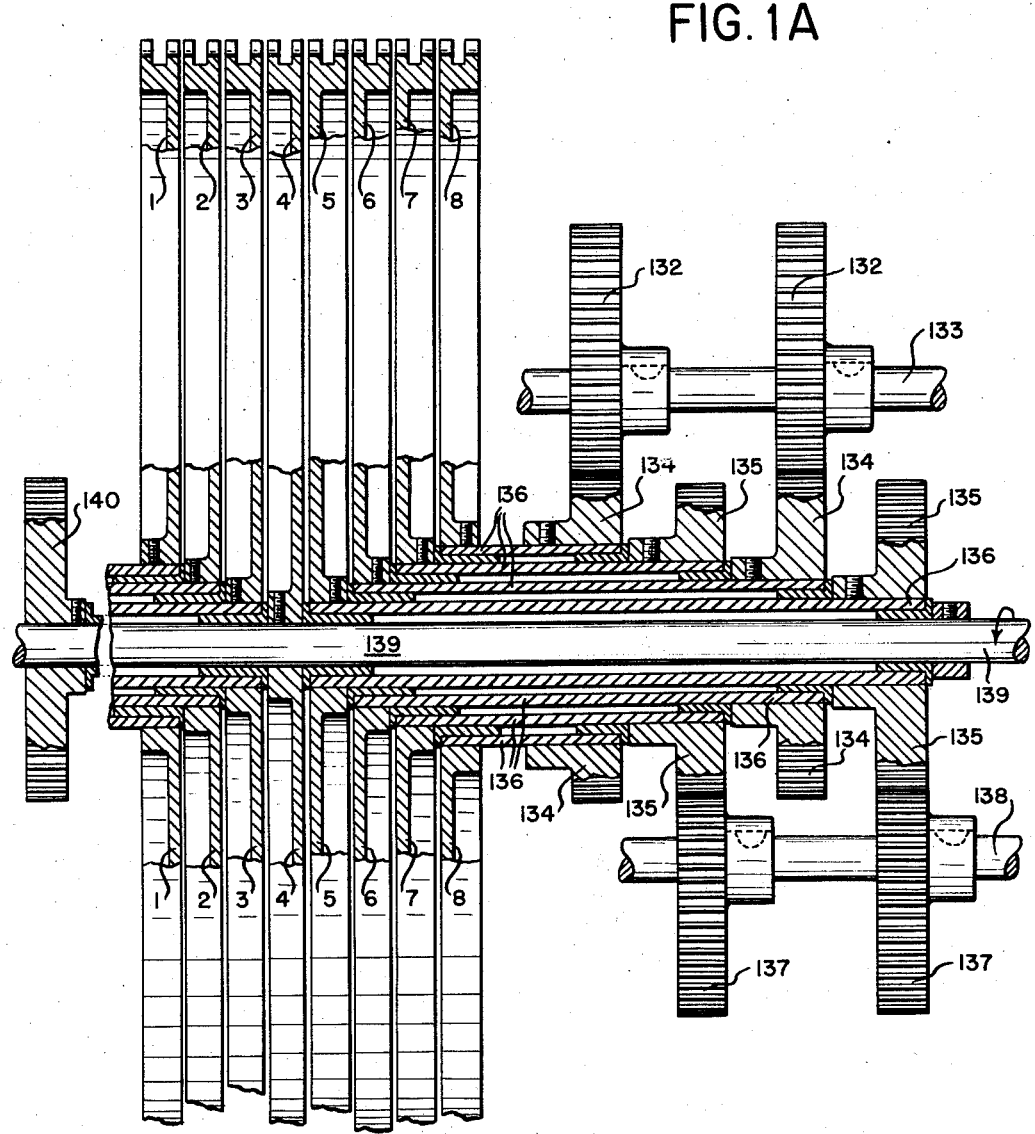
Fig. 1A is a transverse, sectional view on line 1A—1A of Fig. 1.

As more fully described in my copending application, the rods are delivered to a plurality of rolls in which the alternate rolls form two sets, and in which the sets of rolls travel at different speeds. Such an arrangement of rolls is shown at 10 in Fig. 1, the rolls 10 identified as shuffling rolls, consisting of a plurality, for example eight rolls, in which rolls 1, 3, 5, 7 travel at one speed and rolls 2, 4, 6 and 8 at a different speed. As disclosed in application Serial No. 578,989, the rolls are divided into two sets, 1, 3, 5 and 7, traveling at one speed and 2, 4, 6 and 8 at a different speed. These rolls are provided with saddles or pockets 11 on their peripheries, the pockets being equally spaced about each roll and being adapted to receive the filter sections. As more fully described in my earlier application, the speed of the two sets of rolls is such that the faster rolls will advance the space between two pockets over the slower rolls in the travel from the inlet point to the discharge point, substantially 180°. This is illustrated in Fig. 1 where the pockets of a roll 2 are shown in dotted lines with the distance between the pockets of rolls 1 and 2 progressively decreasing from the inlet at about 11 o'clock in the rotation of the rolls to the discharge at 5 o'clock where a pocket, or row of pockets, of the fast travelling rolls overtakes the row of pockets of the slow travelling rolls. In the illustration the shuffling rolls 10 travel in a counter-clockwise direction, as indicated by the arrow.

The alternate rolls may be driven at the desired speeds in any suitable manner. As shown in Fig. 1A, one of two 59 tooth gears 132 mounted on shaft 133 is driven by gearing from a main drive shaft (not shown). Gears 132 mesh with two 59 tooth gears 134. These gears are keyed to sleeves 136 to which two of the faster moving rolls, in this instance, rolls 6 and 8, are keyed. A second gear on the main drive shaft meshes with one of two 60 tooth gears 137 mounted on shaft 138. These two gears mesh with 60 tooth gears 135 also mounted on sleeves 136. These sleeves are keyed to two of the slower traveling rolls, in this instance, rolls 5 and 7. The other rolls to the left in Fig. 1A may be similarly driven, and the drive means has not been duplicated on the drawing. One of the faster driven rolls, illustrated as roll 4, may be keyed to a central shaft 139 which is driven by a 59 tooth gear 140, similar to the gears 134.

Filter rods 12, of one type herein identified as "Grey Rods," are delivered from hopper 14 to a roll 16. At the same time, filter rods 18 are delivered from hopper 20 to a roll 22. The rolls 16 and 22 are identical in design. They are of a length substantially equal to that of the two sets of shuffling rolls 10, or in other words equal to, or slightly greater than, the length of the multiple filter rods 12 and 18. Each of the rolls 16 and 22 contains equally spaced saddles or pockets 24 for the reception of the filter rods and they are rotated at the same speed. The rods are retained in the pockets by shields 26 extending from the inlet end of the machine to the outlet. The inlet is preferably arranged at the top to permit the rods to be fed from the hoppers by gravity. The rolls discharge through chutes 28 which are of such size that the rods feed into them one above the other. The spacing of the bottom of the chutes from the rolls is such that rod will be discharged only when a pocket is beneath the chute.

As the filter rods travel in the pockets of the rolls 16 and 22, they are cut into filter tip sections by cutters arranged along the periphery of the rolls. The knives may be disc knives, rotatably mounted, extending through suitable slots in the shields 26 and entering slots in the rolls 16 and 22 which extend inwardly slightly beyond the depth of the pockets. The specific arrangement of the knives will depend upon the number of filter tip sections of which each rod is composed, and may be varied somewhat for any particular length of rod. The showing here is, therefore, by way of illustration and the invention is not to be considered as limited thereto. As one arrangement, disc knife 30 may be arranged just beyond the inlet of rolls 16 and 22 and positioned laterally to cut the filter rod 12 or 18 in half into two sections of four filter rod lengths. The disc may be bevelled on each side to form the cutting edge, and in the cutting operation each half of the filter rod is pushed laterally a distance equal to one-half the thickness of the disc 30. The remaining discs are bevelled on their outer faces and move the outer section of a rod after each cutting operation outwardly a distance equal to the thickness of the discs. In the illustrated form of the invention, where we assume a filter rod of eight filter sections, disc 30 is mounted on a shaft 32. Beyond shaft 32 I provide a shaft 34 on which is mounted a pair of discs 36 arranged laterally one filter section length outwardly of disc 30, one on each side. These discs thus cut the two inner filter sections from each of the half filter rods, or four filter section rods. Next, a pair of discs 38 on shaft 40 are laterally spaced one filter section outwardly of each of the discs 36, and they in turn each cut a filter section from the three filter section length rods. A final pair of discs 42 on shaft 44 cut the outer two section lengths in half. The rolls 16 and 22 and shields 26 are provided with suitable slots into which the discs extend. As indicated, the slots in the rolls extend slightly beyond the bottom of pockets 24 and the discs are positioned to enter the slots to a point adjacent the bottom and thus assure complete severing of the rods.

A receiving roll 46 is arranged beneath the rolls 16 and 22, and this receiving roll is provided with pockets 48 for the reception of the filter sections. As the roll 46 receives the filter sections from both rolls 16 and 22, it has twice as many pockets as rolls 16 and 22 spaced one-half the distance of the spacing of the pockets on the first two rolls. The rolls are geared together to travel at the same speed. Filter sections are fed to this roll in alternate arrangement, the rolls being so arranged that a pocket 48 will align with a pocket 24 to receive a row of "Grey" filter sections. The next pocket 48 will pass the transfer point before the next pocket 24 arrives and the next pocket 24 will deliver its filter sections into the second following pocket 48. When the roll 46 reaches the delivery point of roll 22, the pockets 48 in which filter sections have not been placed align with pockets 24 to receive the "White" sections and those pockets in which the "Grey" sections have been placed pass the roll 22 out of alignment with pockets 24. The filter sections may be delivered from the rolls 16 and 22 to the roll 46 by gravity, or I may provide a row of fingers 50 arranged in grooves to extend beneath the pockets and reciprocated by suitable means (not shown) at proper intervals to transfer the filter sections from one roll to the other.

From the receiving rolls the rows of filter sections are transferred to the pockets 11 of a unit of shuffling wheels 10. As heretofore explained, a unit of shuffling wheels consists of two sets of alternate wheels with one set traveling at a faster speed than the other. The unit is substantially the same size as the rolls 16, 22 and 46, that is, equal to the length of a filter rod, and each wheel has a dimension substantially equal to that of a filter section. Assuming a unit of eight shuffling wheels, one set, namely, wheels 1, 3, 5 and 7, travel at one speed and the other set, 2, 4, 6 and 8, travel at a different speed as heretofore described. The difference in the speed of travel is such that a set of pockets on the faster set will overtake the preceding set of pockets on the slower set between the feed or inlet, and the discharge point, substantially 180°. Thus, at the discharge point, each transversely aligned row of pockets will consist of alternate filter sections, which are discharged by gravity, or by fingers 58 into pockets 60 of a wrapping roll 62. After discharge of the filter sections, the rolls continue another 180° to the inlet, at which point a row of pockets is again aligned tranversely of the shuffling wheels for the reception of filter sections from the receiving roll 46.

The wrapping roll 62 corresponds to the wrapping roll 24 of my prior application, and per se, forms no part of the present invention. On the wrapping roll, each assembly of filter sections is wrapped in an outer wrapping of paper or the like, forming a laminated filter rod, from which individual or double filter tips are later made, as described in my earlier application.

Figure 2:
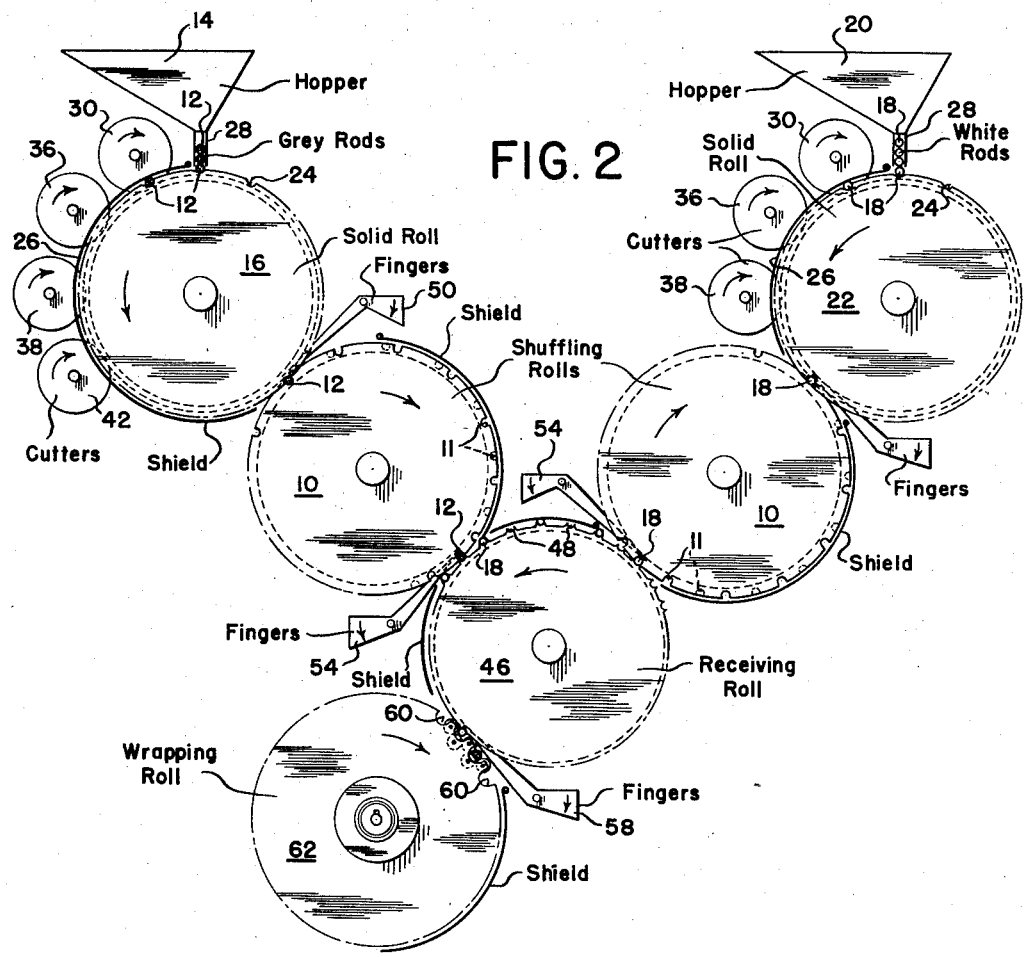
Fig. 2 is a similar view of another form of the invention.

In Fig. 2 I have illustrated another form of the invention in which the same mechanisms are used as in the apparatus of Fig. 1 but with a slightly different arrangement. As shown, the "Grey" rods 12 are fed from hopper 14 through chute 28 to the pockets of the initial roll 16, and the "White" rods 18 are fed from hopper 20 through chute 28 to the pockets of initial roll 22. The rods are cut into filter sections on rolls 16 and 22 by discs 30, 36, 38 and 42 as heretofore described. However, instead of delivering the filter sections of the two types to a receiving roll, as in the apparatus of Fig. 1, I provide two units of shuffling wheels or rolls 10, each receiving the filter sections from one of the rolls 16 or 22. As heretofore described, each unit 10 consists of eight rolls, divided into two sets of alternate rolls travelling at different speeds, the speeds being such that the faster rolls 1, 3, 5 and 7, for instance, will move a distance greater than the slower rolls 2, 4, 6 and 8 equal to one-half the peripheral spacing between two pockets on a roll. The shuffling rolls, travelling in a clock-wise direction, as illustrated in Fig. 2, deliver the filter sections to a receiving roll 46 which is tangent to both the units of shuffling rolls, and which has twice as many pockets spaced one-half the distance from each other. Thus, a pocket on receiving roll 46 will first align with a set of pockets on alternate shuffling wheels containing filter sections and the filter sections will be transferred by fingers 54 to the receiving roll. The pockets of the alternate wheels 10, which are a one-half space behind, will thus align with the next pocket of the receiving roll, as the pockets of the receiving roll are spaced one-half the distance of the pockets of the shuffling wheels. The filter sections in the pockets of the shuffling rolls are deposited in this pocket of the receiving roll. Between the discharge point and the intake, the pockets of each unit of the shuffling wheels will realign as the faster wheels gain a distance equal to one-half of the spacing on the slower wheels.

The pockets of receiving roll 46 thus leave the rolls 10 with each pocket containing filter sections throughout one-half of the pocket spaced from each other, and with the spaces in one pocket aligned with the filter sections in the next pocket. The parts are so timed that when the pockets 48 are tangent to the shuffling wheels of the "Grey" sections, the spaces in a pocket 48 of the receiving roll are beneath the filter sections in the pockets of the shuffling wheels. Fingers 54 then transfer the filter sections to pocket 48. An assembly of alternate filter sections is thus arranged in each pocket 48. As heretofore explained, these assemblies are then transferred to wrapping roll 62, and formed into a laminated filter rod by wrapping them in an outer wrapper.

Still another arrangement, varying slightly from those of Figs. 1 and 2, but employing the same principle, is shown in Fig. 3. In this form of the invention, I employ one initial roll 64 corresponding to the rolls 16 and 22 of the other forms of the invention. The two hoppers 14 and 20 are arranged over this roll and feed the "Grey" rods 12 and "White" rods 18 through chutes 28, as heretofore described, to the periphery of this roll. While I have heretofore referred to rods of eight filter section lengths, as more fully described in my earlier application, I actually employ "Grey" rods of eight filter section lengths and "White" rods of six filter section length, forming laminated rods of seven filter section length. A half-filter section is then trimmed from each end of this laminated rod to produce a six filter section laminated rod with a one-half filter "Grey" section at each end.

The pockets 66 of roll 64 are alternately of a length to receive the long "Grey" rods 12 and the short "White" rods 18. As the spacing of the bottom of the chutes 28 from the surface of the roll is such that a rod can only be delivered from the chute when an empty pocket is beneath it, the longer rods will not enter the short pockets. The short pockets thus pass the chute of hopper 14 and receive the short "White" rods when they pass beneath the chute or hopper 20. As the filter rods 12 must thus be delivered to the pockets 66 first, the position of hoppers 14 and 20 is reversed from that shown in the other forms of the invention. Thus, filter rods of each type are placed in the pockets of roll 64, and are carried past cutters similar to the cutters 30, 36, 38 and 48 heretofore described. The rods are cut into filter sections.

Aligned rows of filter sections of each type are alternately delivered to the pockets 11 of a unit of shuffling rolls 10. As heretofore described, the unit consists of two sets, each set consisting of alternate rolls with one set traveling faster than the other, and at such speed that a row of pockets on the fast set will overtake the preceding row of pockets on the slower set between the inlet and outlet, substantially 180°. Thus, a row of alternate sections of the two types is delivered to the pockets 60 of wrapping roll 62. After passing the discharge point, the pockets of the faster wheels 10 will again travel ahead of the pockets of the slower wheels, but in the 180° travel to the inlet, they will align with the preceding row of pockets of the slow-moving rolls or wheels to provide a transverse row of pockets at the inlet for the reception of a row of filter sections from the roll 64.

Figure 4:
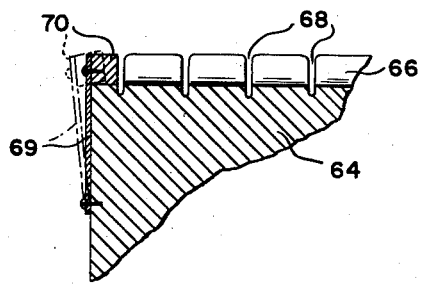
Fig. 4 is a detailed, sectional view of a portion of one of the rolls of Fig. 3.

In Fig. 4 I have shown a detailed view of a portion of the roll 64. As heretofore stated, the rolls 16, 22 and 64 on which the filter rods are cut into filter sections are provided with slots 68 to receive the cutting discs. As the filter rods are cut, the discs move the cut segments apart a distance equal to the thickness of the cutting disc. Springs 69 are mounted on the ends of the rolls in alignment with the pockets 66. These springs carry plugs 70 which are arranged in the ends of the pockets. In the cutting operations, the plugs are pushed outwardly and the springs assume the dotted line position. After the pocket passes a cutting disc, the springs push the plugs 70 inwardly to properly align the segments for the next cut. The length of plugs 70 is greater in the case of pockets 66 receiving the shorter rods 18 than in the case of pockets receiving the longer rods 12, thereby making the receiving pockets 66 alternatively longer and shorter in order to control the alternate deposition of the shorter rods 18 and the longer rods 12 on the receiving drum 64.

As set forth in my copending application, the two different types of filter sections which form the "laminated filter tip" may be two sections each of which performs a filtering operation, such as an outer section that is received in the smoker's mouth such as a tube containing cellulose sheet material arranged in the tube to form a plurality of generally longitudinal, tortuous passages; and an inner section between the outer section and the cigarette proper which may consist of any other type of filter, such as a tube containing paper or other sheet cellulose material arranged in the tube to form a plurality of generally longitudinally tortuous passages, with an adsorbent, such as activated charcoal, arranged on the sheets, or it may be any other form of filter section differing in some respect from the first, or outer, section of the filter. The outer section may also be a hollow tube or cylinder formed of paper, a cellulose base material, various film-forming materials or thin metal, thus producing a "recessed" filter tip.

I claim:

1. The process of making laminated filters for cigarettes which comprises delivering filter rods of multiple filter section lengths of one type to carriers on a moving member, delivering filter rods of another type of multiple filter section length to carriers on a moving member, cutting the filter rods into filter sections while on the carriers, transferring the filter sections of both types in aligned rows of filter sections to carriers on a plurality of shuffling wheels, the alternate shuffling wheels in which the filter sections are received traveling at different speeds, the speed of the shuffling wheels being such that an aligned row of alternate filter sections of the two types reach the discharge point at the same time, and discharging the aligned filter sections.

2. The process of making laminated filters for cigarettes which comprises delivering filter rods of multiple filter section lengths of one type to carriers on a moving member, delivering filter rods of another type of multiple filter section length to carriers on a moving member, cutting the filter rods into filter sections while on the carriers, transferring the filter sections of both types in aligned rows of filter sections to the carriers of a unit of shuffling wheels, the shuffling wheels comprising two sets formed of alternate wheels with one set of wheels traveling at a different speed from the speed of the other set, the speed of the sets of shuffling wheels being correlated to align alternate filter sections of one type with alternate filter sections of the other type at the discharge end of the machine, and discharging the aligned, alternate filter sections.

3. The process of making laminated filters for cigarettes which comprises delivering filter rods of multiple filter section lengths of one type to carriers on a moving member, delivering filter rods of another type to carriers on a second moving member, cutting the filter rods in the carriers of each of the moving members into filter sections, transferring the filter sections from the two moving members to alternate carriers of another moving member, transferring the rows of alternate filter sections of the two types to carriers of a unit of suffling wheels, the wheels consisting of two sets traveling at different speeds, the speed of the two sets being correlated so that a row of pockets of the faster traveling wheels will overtake the preceding row of the slower traveling wheels between the inlet and discharge point to align a row of alternate filter sections of the two types, and discharging the aligned filter sections.

4. The process of making laminated filters for cigarettes which comprises delivering filter rods of multiple filter section lengths of one type to carriers on a moving member, delivering filter rods of another type of multiple filter section length to alternate carriers on the moving member, cutting the filter rods into filter sections while in the carriers, transferring the rows of alternate filter sections of the two types to carriers of a unit of shuffling wheels, the wheels consisting of two sets traveling at different speeds, the speed of the two sets being correlated so that a row of pockets of the faster traveling wheels will overtake the preceding row of the slower traveling wheels between the inlet and discharge point to align a row of alternate filter sections of the two types, and discharging the aligned filter sections.

5. The process of making laminated filters for cigarettes which comprises delivering filter rods of multiple filter section lengths of one type to carriers on a moving member, delivering filter rods of another type of multiple filter section length to carriers on a moving member, cutting the filter rods into filter sections while on the carriers, transferring the rows of filter sections of each type to carriers of units of shuffling wheels, each unit of shuffling wheels comprising two sets of alternate wheels traveling at different speeds, transferring the row of spaced filter sections from one row of the carriers of the faster traveling set of shuffling wheels to a carrier of a receiving roll, transferring the row of spaced filter sections of the slower traveling set of shuffling wheels to the following carrier of said receiving roll, and then transferring the two spaced rows of filter sections of the second unit of shuffling rolls to the spaces in the carriers of the shuffling roll to form aligned rows of alternate filter sections of the two types.

6. Apparatus of the character described comprising means for delivering filter rods of one type of multiple filter section length to carriers of a moving member, means for delivering filter rods of another type of multiple filter section length to carriers of a moving member, means for cutting the filter rods into filter sections while in the carriers, means for transferring the rows of aligned filter sections to carriers on a unit of shuffling wheels, the shuffling wheel unit comprising two sets of alternate wheels with the wheels of each set traveling at the same speed and at a different speed from the wheels of the other set, the speeds of the two sets of wheels being correlated to align a row of carriers of the faster moving set of wheels with the preceding row of carriers of the slower moving set of wheels at the discharge end of the machine to form a row of alternate aligned filter sections, and means for discharging the filter sections.

7. Apparatus of the character described comprising means for delivering filter rods of one type of multiple filter section length to carriers of a moving member, means for delivering filter rods of another type of multiple filter section length to carriers of a moving member, means for cutting the filter rods into filter sections while in the carriers, means for transferring the rows of aligned filter sections to a unit of shuffling wheels, the unit of shuffling wheels consisting of two sets of alternate wheels in which one set travels faster than the second set, the speed of travel of the sets of shuffling wheels being such that a row of carriers of the faster set will overtake a preceding row of carriers of the slower set between the point of delivering of the filter sections to the shuffling wheels and the discharge point to form a row of alternate, aligned filter sections, and means for discharging the row of filter sections.

8. Apparatus of the character described comprising means for delivering filter rods of one type of multiple filter section length to carriers of a moving member, means for delivering filter rods of another type of multiple filter section length to carriers on a second moving member, means for cutting the filter rods in the carriers of the moving members into filter sections, means for transferring the rows of filter sections so formed from the first two moving members to alternate carriers of another moving member, a unit of shuffling wheels arranged tangent to the last mentioned moving member, the shuffling wheels having spaced carriers to receive the alternate rows of filter sections from the last mentioned moving member, the shuffling wheels and carriers being of a size to receive one filter section in each carrier of the shuffling wheels, the shuffling wheels being arranged in two sets of alternate wheels, with the wheels of one set traveling faster than the wheels of the other set, and with the speed of the two sets of wheels correlated to cause a row of carriers of the faster set of wheels to overtake a preceding row of carriers of the slower set of wheels between the point of delivery of the rows of filter sections and the discharge to align a row of alternate filter sections of the two types, and means for discharging said row of filter sections.

9. Apparatus of the character described comprising means for delivering filter rods of one type of multiple filter section length to carriers of a moving member, means for delivering filter rods of another type of multiple filter section length to alternate carriers of the moving member, means for cutting the filter rods into filter sections while in the carriers, a unit of shuffling wheels arranged tangent to the moving member, the shuffling wheels having spaced carriers to receive the alternate rows of filter sections from the moving member, the shuffling wheels and carriers being of a size to receive one filter section in each carrier of the shuffling wheels, the shuffling wheels being arranged in two sets of alternate wheels, with the wheels of one set traveling faster than the wheels of the other set, and with the speed of the two sets of wheels correlated to cause a row of carriers of the faster set of wheels to overtake a preceding row of carriers of the slower set of wheels between the point of delivery of the rows of filter sections and the discharge to align a row of alternate filter sections of the two types, and means for discharging said row of filter sections.

10. Apparatus of the character described comprising means for delivering filter rods of one type of multiple filter section length to carriers of a moving member, means for delivering filter rods of another type of multiple filter section length to carriers of a moving member, means for cutting the filter rods into filter sections while in the carriers, a unit of shuffling wheels arranged tangent to each of the moving members, each of the shuffling wheels having spaced pockets to receive filter sections from the pockets of the moving members, each of said units consisting of two sets of alternate wheels with the wheels of one set traveling faster than the wheels of the other set, and with the speed of the two sets of wheels correlated to cause a row of carriers of the faster set of wheels to overtake a preceding row of carriers of the slower set of wheels between the point of delivery of the rows of filter sections and the discharge, a receiving roll arranged tangent to said units of shuffling wheels and spaced carriers on the receiving roll, each carrier being arranged to receive a row of alternate, spaced filter sections from one of said shuffling wheel units, and a row of alternate spaced filter sections from the second unit in the spaces between the first received filter sections to form an assembly of aligned, alternate filter sections.

References Cited in the file of this patent

UNITED STATES PATENTS 2,652,138     Jackson  ---------------- Sept. 15, 1953